United States Patent
Ryu et al.

(10) Patent No.: US 10,977,468 B2
(45) Date of Patent: Apr. 13, 2021

(54) OPTICAL UNIT FOR A FINGERPRINT SENSOR AND DISPLAY DEVICE INCLUDING THE SAME

(71) Applicant: Samsung Display Co., Ltd., Yongin-si (KR)

(72) Inventors: Ji Hun Ryu, Yongin-si (KR); Katsumasa Yoshii, Yongin-si (KR); Yun Ho Kim, Yongin-si (KR); Il Nam Kim, Yongin-si (KR); Eun Jin Sung, Yongin-si (KR)

(73) Assignee: SAMSUNG DISPLAY CO., LTD.

( * ) Notice: Subject to any disclaimer, the term of this patent is extended or adjusted under 35 U.S.C. 154(b) by 0 days.

(21) Appl. No.: 16/434,154

(22) Filed: Jun. 6, 2019

(65) Prior Publication Data
US 2020/0065547 A1  Feb. 27, 2020

(30) Foreign Application Priority Data
Aug. 23, 2018 (KR) .......................... 10-2018-0098600

(51) Int. Cl.
G06K 9/00 (2006.01)
G02B 5/00 (2006.01)
G02B 5/04 (2006.01)

(52) U.S. Cl.
CPC ......... *G06K 9/00013* (2013.01); *G02B 5/003* (2013.01); *G02B 5/04* (2013.01)

(58) Field of Classification Search
None
See application file for complete search history.

(56) References Cited

U.S. PATENT DOCUMENTS

| | | | |
|---|---|---|---|
| 7,366,331 B2 | 4/2008 | Higuchi | |
| 2012/0287254 A1* | 11/2012 | Higuchi | G06K 9/00046 348/77 |
| 2017/0323140 A1* | 11/2017 | Huang | G06K 9/0004 |
| 2019/0228204 A1* | 7/2019 | Park | G09G 3/22 |

FOREIGN PATENT DOCUMENTS

KR  10-2018-0001904  1/2018

* cited by examiner

*Primary Examiner* — Joseph R Haley
(74) *Attorney, Agent, or Firm* — H.C. Park & Associates, PLC

(57) ABSTRACT

An optical unit and a display device including same. The optical unit is for a fingerprint sensor of the display device, and the optical unit includes a first prism to block light rays incident at an angle greater than a detection target incident angle; and a second prism disposed under the first prism to block light rays incident at an angle less than the detection target incident angle.

17 Claims, 6 Drawing Sheets

OPTICAL UNIT FOR A FINGERPRINT SENSOR AND DISPLAY DEVICE INCLUDING THE SAME

CROSS REFERENCE TO RELATED APPLICATION

This application claims priority from and the benefit of Korean Patent Application No. 10-2018-0098600 filed on Aug. 23, 2018, which is hereby incorporated by reference for all purposes as if fully set forth herein.

BACKGROUND

Field

Exemplary implementations of the invention relate generally to an optical unit and a display device including the optical unit and, more particularly, to an optical unit for a fingerprint sensor unit that may be integrated in a display or other type of electronic device.

Discussion of the Background

Recently, portable electronic devices, such as smartphones and the like, support a fingerprint recognition function. According to the conventional art, a fingerprint sensor is placed on the periphery of the lower part of a display area on the exterior of an electronic device or at the back side of the case of the electronic device, and a fingerprint is recognized using the fingerprint sensor. However, an electronic device in which a display area extends in the entire front surface has been recently released, and in such an electronic device, a fingerprint sensor is layered with a display panel.

A fingerprint consists of ridges and valleys. A fingerprint sensor identifies a fingerprint by removing light rays generated by the valleys thereof and extracting only light rays generated by the ridges thereof. To this end, the fingerprint sensor includes an optical unit configured to filter light rays and a light-receiving unit configured to receive and process the filtered light rays.

In order to more correctly identify a fingerprint in an electronic device, an optical unit having a structure in which only light rays incident at a detection target incident angle are accurately extracted is required.

The above information disclosed in this Background section is only for understanding of the background of the inventive concepts, and, therefore, it may contain information that does not constitute prior art.

SUMMARY

Optical units and display devices constructed according to the principles and exemplary implementations of the invention are capable of accurately identifying a fingerprint.

According to some exemplary implementations of the invention, an optical unit and a display device including the same are capable of removing light rays generated by the valleys of a fingerprint and accurately extracting only light rays generated by the ridges of the fingerprint.

Furthermore, according to some exemplary implementations of the invention, an optical unit and a display device including the same are capable of extracting only light rays incident at a detection target incident angle by including multiple layers of prisms, each of which has first inclined surfaces and second inclined surfaces, the inclination angle of which differ from that of the first inclined surfaces.

Additional features of the inventive concepts will be set forth in the description which follows, and in part will be apparent from the description, or may be learned by practice of the inventive concepts.

According to one exemplary embodiment of the invention, an optical unit may include a first prism to block light rays incident at an angle greater than a detection target incident angle and a second prism disposed under the first prism and to block light rays incident at an angle less than the detection target incident angle.

Also, the detection target incident angle may fall within a range from about 43 degrees to about 47 degrees.

Also, the optical unit may further include a third prism supporting the first prism and being disposed between the first prism and the second prism.

Also, the first prism may include an upper surface and a lower surface, the lower surface including at least one first inclined surface and at least one second inclined surface, the at least one first inclined surface and the at least one second inclined surface are alternately disposed and have different inclination angles.

Also, in the optical unit, an angle between the at least one first inclined surface and a straight line perpendicular to the upper surface of the first prism may be about 45 degrees, and an angle between the at least one second inclined surface and a straight line perpendicular to the upper surface of the first prism may fall within a range from about 80 degrees to about 88 degrees.

Also, the optical unit may further include a light-absorbing layer provided on the at least one first inclined surface to absorb light rays incident thereon.

Also, the second prism may include an upper surface and a lower surface, the lower surface including at least one first inclined surface and at least one second inclined surface, the at least one first inclined surface and the at least one second inclined surface are alternately disposed and have different inclination angles.

Also, in the optical unit, an angle between the at least one first inclined surface of the second prism and a straight line perpendicular to the upper surface of the second prism may be about 45 degrees, and an angle between the at least one second inclined surface of the second prism and a straight line perpendicular to the upper surface of the second prism may fall within a range from about 2 degrees to about 10 degrees.

Also, the optical unit may further include a light-absorbing layer provided on the at least one first inclined surface of the second prism to absorb light rays incident thereon.

Also, the third prism may include an upper surface and a lower surface in contact with the upper surface of the second prism, the upper surface facing the lower surface of the first prism and has a shape conforming to the shape of the lower surface of the first prism.

Also, the upper surface of the third prism may include at least one first inclined surface that faces the at least one first inclined surface of the first prism and is parallel to the at least one 1-1-th inclined surface; and at least one second inclined surface that faces the at least one second inclined surface of the first prism and is substantially parallel to the at least one second inclined surface of the first prism.

Also, the upper surface of the third prism may include at least one first inclined surface that faces the at least one first inclined surface of the first prism and is substantially parallel to the at least one 1-1-th inclined surface; and at least one second inclined surface that faces the at least one second inclined surface of the first prism and is angled relative to the at least one second inclined surface of the first prism.

Also, the optical unit may further include an air layer or a low-refractive-index layer disposed between the first prism and the third prism.

According to another exemplary embodiment of the invention, a display device may include a display panel to display an image; and an optical unit for a finger print sensor disposed under the display panel to transmit only light rays incident at a detection target incident angle, wherein the optical unit comprises at least one prism having multiple inclined surfaces alternately disposed and having different inclination angles.

Also, the display device may include a first prism to block light rays incident at an angle greater than the detection target incident angle and a second prism disposed under the first prism to block light rays incident at an angle less than the detection target incident angle.

Also, the display device may further include a third prism configured to support the first prism and being disposed between the first prism and the second prism.

Also, the first prism may include an upper surface and a lower surface, including at least one first inclined surface and at least one second inclined surface, which are alternately disposed and have different inclination angles; the second prism may include an upper surface and a lower surface, including at least one first inclined surface and at least one second inclined surface, which are alternately disposed and have different inclination angles; and the third prism may include an upper surface, which faces the lower surface of the first prism and has a shape conforming with the shape of the lower surface of the first prism, and a lower surface in contact with the upper surface of the second prism.

Also, the display device may further include a first light-absorbing layer and a second light-absorbing layer provided on the first inclined surface of the first prism and the first inclined surface of the second prism, respectively.

Also, the display panel may include a multilayer film including multiple insulating layers having different refractive indices, and the optical unit may include a first prism, including an upper surface and a lower surface, which includes at least one first inclined surface and at least one second inclined surface, which are alternately disposed and have different inclination angles.

According to another exemplary embodiment of the invention, an electronic device may include a display panel to display an image, an optical unit for a fingerprint sensor disposed under the display panel to transmit only light rays incident at a detection target incident angle, wherein the optical unit comprises at least one prism, and a light-receiving unit to collect light rays passing through the optical unit and to convert the light rays into electrical signals, the at least one prism having multiple inclined surfaces, which are alternately disposed and have different inclination angles.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 1:
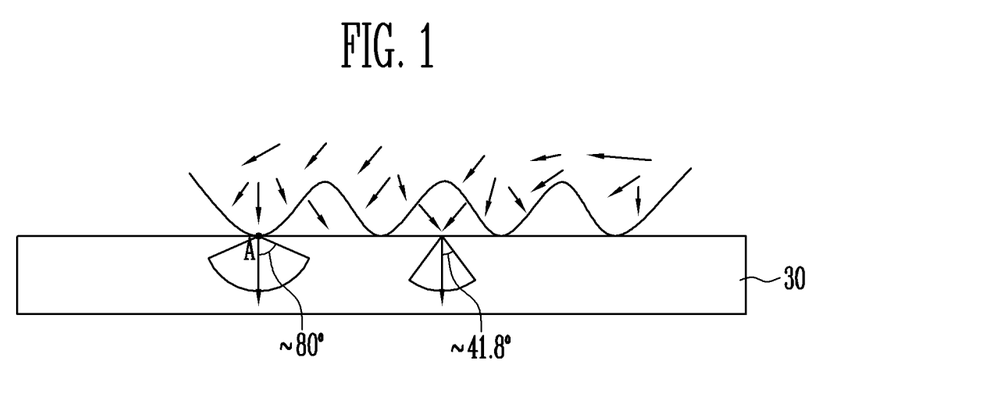
FIG. 1 is a schematic diagram for explaining the general operation principle of a fingerprint sensor.

FIG. 1 is a schematic diagram for explaining the general operation principle of a fingerprint sensor.

Referring to FIG. 1, when a user places his or her finger on the cover glass 30 of a display panel, ambient light is projected onto the cover glass 30 through the skin of the user. The light incident from the skin of the user onto the cover glass 30 is refracted at the surface of the cover glass 30 due to the difference between the refractive index of the skin and the refractive index of the cover glass 30, and the refracted light enters the cover glass 30 at an angle predetermined depending on the degree of refraction.

The fingerprint of a user consists of ridges and valleys. A ridge in the fingerprint comes in contact with the surface of the cover glass 30 at point A, and the valleys are spaced apart from the surface of the cover glass 30. Therefore, light incident from a ridge onto the cover glass 30 and light incident from a valley to the cover glass 30 have different incident angles. Generally, the incident angle at which light is incident on the cover glass 30 at point A, at which the ridge comes in contact with the cover glass 30, is equal to or less than about 80 degrees, but the incident angle at which light is incident from a valley, which is spaced apart from the cover glass 30, onto the cover glass 30 is equal to or less than about 41.8 degrees.

A fingerprint sensor filters only light incident at a certain angle (hereinafter, referred to as a 'detection target incident angle'), thereby removing light incident from valleys and extracting only light incident from ridges. To this end, the fingerprint sensor may include an optical unit configured to transmit only light incident at a specific angle. Also, the fingerprint sensor may receive light from the optical unit using a light-receiving unit, convert the light into an electrical signal, process the electrical signal, and deliver the processed electrical signal to a control unit and the like.

As described above, in order to identify a user's fingerprint in an electronic device, an optical unit for optical filtering with high accuracy is required. Embodiments of the invention generally provide a display device including a display panel 10 and an optical unit 20 disposed under the display panel 10, which are disposed between a cover glass 30 and the light-receiving unit of a fingerprint sensor.

Figure 2:
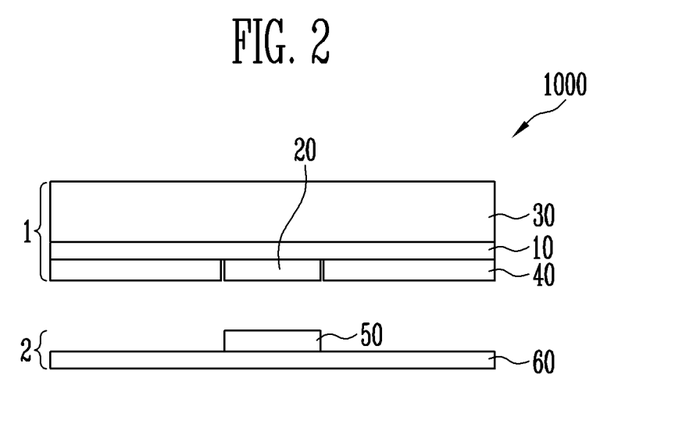
FIG. 2 is a cross-sectional view of an electronic device including a display device constructed according to an exemplary embodiment of the invention.

FIG. 2 is a cross-sectional view of an electronic device including a display device according to an exemplary embodiment of the invention.

Referring to FIG. 2, the electronic device according to an exemplary embodiment of the invention may include a display device 1, which includes a cover glass 30, a display panel 10, and an optical unit 20, and a base 2, which includes a light-receiving unit 50 and a printed circuit board 60.

The cover glass 30 may be made of materials that include at least one of glass, sapphire, diamond, polymethylmethacrylate (PMMA), and polycarbonate (PC). The cover glass 30 is provided in order to protect the display panel 10 by being bonded to the upper surface of the display panel 10 using an adhesive or the like.

In an exemplary embodiment, the cover glass 30 may include a base film and a light-shielding pattern. The base film may include a glass substrate and/or a synthetic resin film. The light-shielding pattern partially overlaps the base film, and may define a non-display area on which an image is not displayed in the display device 1. The light-shielding pattern is a colored organic film and, for example, may be formed using a coating method.

The cover glass 30 may further include a functional coating layer that is disposed on the front surface of the base film. The functional coating layer may include an anti-fingerprint layer, an anti-reflection layer, a hard coating layer, and the like.

The display panel 10 may display an image under the control of at least one driving module. The display panel 10 according to an exemplary embodiment may be a light-emitting display panel, but is not limited thereto. For example, the display panel 10 may be an organic light-emitting display panel or a quantum dot light-emitting display panel. The light-emitting layer of an organic light-emitting display panel may include organic light-emitting materials. The light-emitting layer of a quantum dot light-emitting display panel may include quantum dots, quantum rods, and the like. Hereinafter, the display panel will be described as an organic light-emitting display panel, but the invention is not limited thereto.

In various exemplary embodiments, an anti-reflection layer may be further included between the display panel 10 and the cover glass 30. The anti-reflection layer may include a color filter, a structure in which a conductive layer, a dielectric layer, and a conductive layer are stacked, or an optical member. The anti-reflection layer may reduce external light reflectance by absorbing external light, by polarizing external light, or through the destructive interference of external light.

In various exemplary embodiments of the invention, an input-sensing unit may be further disposed between the display panel 10 and the cover glass 30. The input-sensing unit may be provided in order to acquire information about coordinates related to external input (for example, coordinates at which a touch event occurred). The input-sensing unit may be a touch-sensing panel for sensing a touch by a user or a fingerprint-sensing panel for sensing the fingerprint information of a user's finger. Also, the input-sensing unit may be a digitizer-sensing panel for sensing a digitizer pen. Such an input-sensing unit may completely or partially overlap a display area on which an image is displayed in the display panel 10, or may overlap only a non-display area.

The optical unit 20 may be disposed on the lower surface of the display panel 10. The optical unit 20 may be bonded to the lower surface of the display panel 10 using an adhesive or the like. The optical unit 20 functions as a filtering layer for filtering light rays that pass through the cover glass 30 and the display panel 10. In an exemplary embodiment, the optical unit 20 may be configured to filter only light rays generated by the ridges of a fingerprint, among light rays that are generated by the fingerprint of a user and are incident by passing through the cover glass 30 and the display panel 10. To this end, the optical unit 20 may include multiple layers of prisms, each of which has first inclined surfaces and second inclined surfaces, the inclination angle of which differs from that of the first inclined surfaces. The specific structure of embodiments of the optical unit 20 will be described below with reference to FIGS. 3 to 11.

In an exemplary embodiment, the optical unit 20 may be bonded to the entire area of the other side of the display panel 10. In another exemplary embodiment, the optical unit 20 may be bonded to the partial area of the display panel 10, in which case a protective layer 40 may be disposed on the lower surface of the display panel 10, on the area that the optical unit 20 is not disposed.

The protective layer 40 is provided in order to prevent permeation of moisture or the like into the display panel 10 and to protect the display panel 10 by absorbing external shock. The protective layer 40 may include a plastic film that includes any one selected from the group consisting of polyether sulfone (PES), polyacrylate (PAR), polyetherimide (PEI), polyethylene naphthalate (PEN), polyethylene terephthalate (PET), polyphenylene sulfide (PPS), polyarylate, polyimide (PI), polycarbonate (PC), poly arylene ether sulfone, and a combination thereof.

A material constituting the protective layer 40 is not limited to plastic resins, and may include an organic/inorganic composite material. The protective layer 40 may include a porous organic layer and an inorganic material filled in the pores of the organic layer. The protective layer 40 may further include a functional layer formed on a plastic film. The functional layer may include a resin layer, and may be formed using a coating method.

In an exemplary embodiment, the protective layer 40 may consist of a black film and the like in order to block light from the outside.

The display device 1 may be coupled to the base 2 of the electronic device 1000. The base 2 may include a printed circuit board 60, on which control circuits for controlling the electronic device 1000 are disposed, and a light-receiving unit 50 disposed on the printed circuit board 60.

When the display device 1 is coupled to the base 2, light rays passing through the optical unit 20 may be received by the light-receiving unit 50. The light-receiving unit 50 may include a CCD, a CMOS, a CMOS image sensor (CIS), or a photodiode. The light-receiving unit 50 may convert the received light rays into electrical signals and deliver the electrical signals to the control circuits of the electronic device 1000. The control circuits process the electrical signals, whereby the fingerprint of a user may be identified.

Hereinafter, the structure of the optical unit 20 configured to remove light rays generated by the valleys of the fingerprint of a user and to effectively filter only light rays generated by the ridges will be described in detail.

Figure 3A:
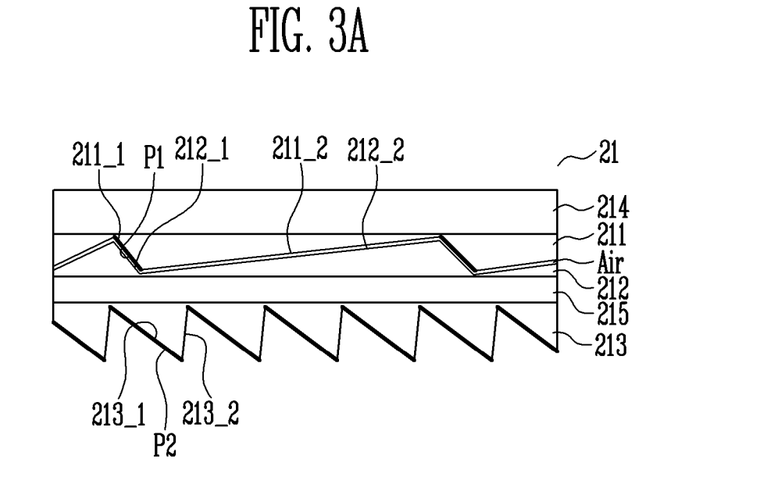
FIGS. 3A and 3B are cross-sectional views of an optical unit constructed according to a first exemplary embodiment of the invention.
Figure 3B:
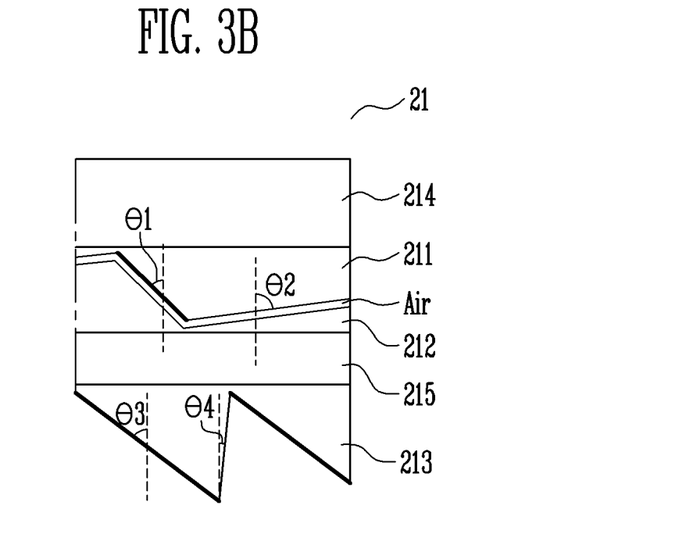
Figure 4:
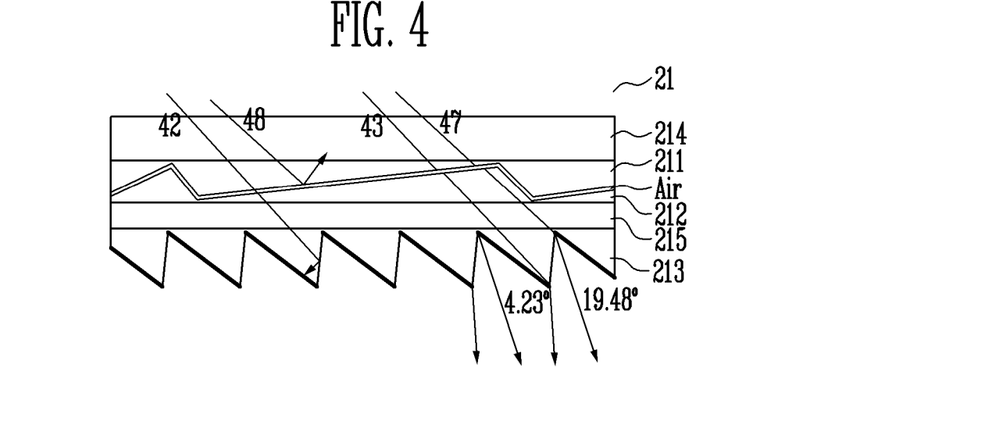
FIG. 4 is a cross-sectional view schematically illustrating the operational principle of the optical unit constructed according to the first exemplary embodiment of the invention.
Figure 5:
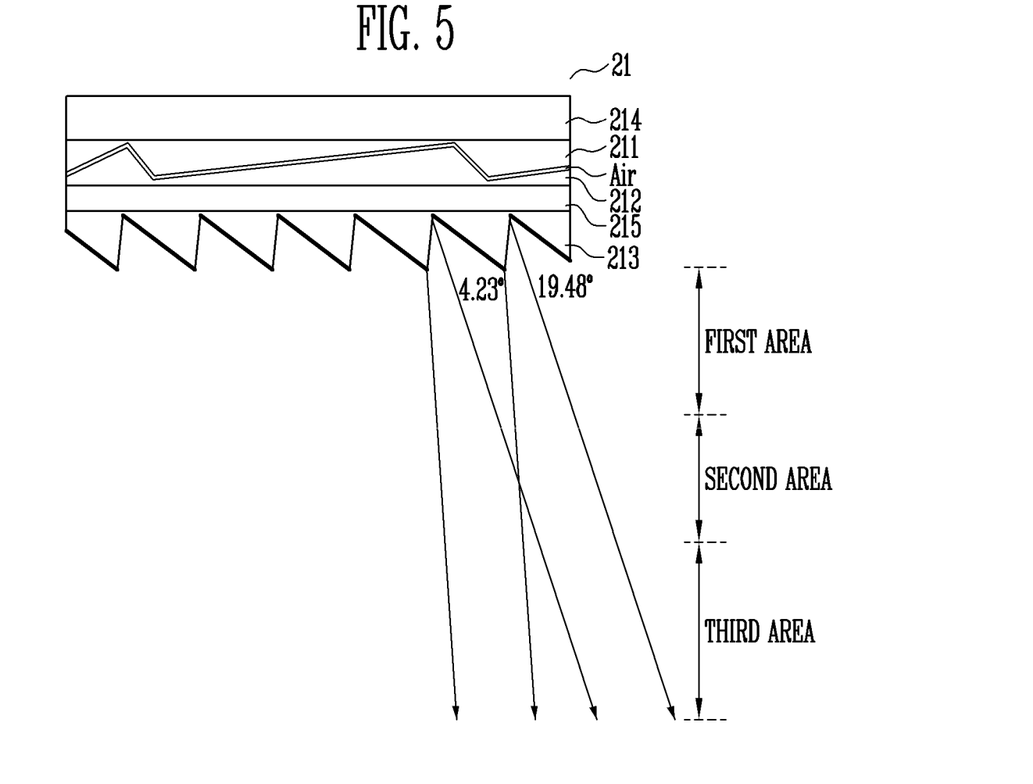
FIG. 5 is a cross-sectional view for explaining the arrangement of an optical unit and a light-receiving unit according to the principles of the invention.

FIG. 3A and FIG. 3B are cross-sectional views of an optical unit according to a first exemplary embodiment of the invention, FIG. 4 is a cross-sectional view schematically illustrating the operation principle of the optical unit constructed according to the first exemplary embodiment of the invention, and FIG. 5 is a cross-sectional view for explaining the restriction of arrangement of an optical unit and a light-receiving unit according to the principles of the invention.

Referring to FIG. 3A, FIG. 3B, and FIG. 4, the optical unit 21 according to the first exemplary embodiment of the invention may include at least one prism configured to transmit only light rays incident at an angle that falls within a detection target incident angle range and to deliver the transmitted light rays to a light-receiving unit 50. Specifically, the optical unit 21 may be configured to transmit only light rays incident at an angle that falls within the range of about 45±2 degrees, among light rays incident thereon.

To this end, the optical unit 21 may include a first prism 211, a second prism 212, and a third prism 213. Each of the prisms 211, 212 and 213 may be made of a material having a reflectance in the range of 1.4 to 1.6. In an exemplary embodiment, each of the prisms 211, 212 and 213 may be made of a glass material, the reflectance of which is about 1.5. Each of the prisms 211, 212 and 213 may include first inclined surfaces and second inclined surfaces, the inclination angle of which differs from that of the first inclined surfaces.

The first prism 211 is configured to filter light rays incident at an angle that is greater than the detection target incident angle. For example, the first prism 211 may be configured to block light rays incident at an angle that is greater than about 47 degrees.

The upper surface of the first prism 211 may be substantially flat. In an exemplary embodiment of the invention, an upper substrate 214 may be disposed on the upper surface of the first prism 211. The upper substrate 214 may be provided in order to protect the other components of the optical unit 21 when the optical unit 21 is placed in contact with the lower surface of the display panel 10. In an exemplary embodiment, the upper substrate 214 may be made of a glass material, but is not limited thereto. The upper substrate 214 may be made of any material having the same refractive index as the first prism 211, which is bonded to the upper substrate 214. Accordingly, light may not be refracted at the surface on which the upper substrate 214 and the first prism 211 are in contact with each other.

The lower surface of the first prism 211 may include at least one 1-1-th inclined surface 211_1 and at least one 1-2-th inclined surface 211_2, which have different inclination angles and are alternately disposed. The at least one 1-1-th inclined surface 211_1 and the at least one 1-2-th inclined surface 211_2, which are alternately disposed, form prism mountains and prism valleys in parts at which they meet. Here, the 1-1-th inclined surface 211_1 may be an absorbing surface for absorbing light rays incident thereon, and the 1-2-th inclined surface 211_2 may be a transmitting surface for blocking light rays incident at an angle greater than the detection target incident angle.

The 1-1-th inclined surface 211_1 may be configured to absorb light rays coming from the right side of a straight line perpendicular to the upper surface of the first prism 211 to the left side thereof. For example, a light-absorbing layer P1, including a light-absorbing material, may be formed on the 1-1-th inclined surface 211_1. In various exemplary embodiments of the invention, the angle (a 1-1-th inclination angle, $\theta 1$) between the 1-1-th inclined surface 211_1 and a straight line perpendicular to the upper surface of the first prism 211 may be about 45 degrees.

The 1-2-th inclined surface 211_2 may be configured to filter light rays coming from the left side of a straight line perpendicular to the upper surface of the first prism 211 to the right side thereof. The 1-2-th inclined surface is configured to reflect light rays incident at an angle greater than the detection target incident angle and to refract the remaining light rays downwards. In various exemplary embodiments of the invention, the angle (a 1-2-th inclination angle, $\theta 2$) between the 1-2-th inclined surface 211_2 and a straight line perpendicular to the upper surface of the first prism 211 may fall within a range from about 80 to about 88 degrees, and in a preferred exemplary embodiment, the 1-2-th inclination angle ($\theta 2$) may be about 84 degrees.

As illustrated in FIG. 4, light rays incident at an angle that is greater than the detection target incident angle (for example, about 43 to about 47 degrees) are blocked by the first prism 211, and only light rays incident at an angle that is equal to or less than the detection target incident angle are transmitted by the first prism 211.

Under the first prism 211, the second prism 212 is disposed. The second prism 212 may be provided in order to stably support the 1-1-th inclined surface 211_1 and the 1-2-th inclined surface 211_2 formed on the lower surface of the first prism 211. To this end, the upper surface of the second prism 212 has a shape that matches the shape of the lower surface of the first prism 211, and the lower surface of the second prism 212 may be flat.

Specifically, the second prism 212 may include at least one 2-1-th inclined surface 212_1, which faces the at least one 1-1-th inclined surface 211_1, and at least one 2-2-th inclined surface 212_2, which faces the at least one 1-2-th inclined surface 211_2. In the first exemplary embodiment of the invention, the 2-1-th inclined surface 212_1 is parallel to the 1-1-th inclined surface 211_1 of the first prism 211, and the 2-2-th inclined surface 212_2 is parallel to the 1-2-th inclined surface 211_2 of the first prism 211.

In various exemplary embodiments of the invention, a thin air layer may be formed between the first prism 211 and the second prism 212. That is, the first prism 211 and the second prism 212 are configured to partially contact each other, rather than including an adhesive component therebetween. Because the process of producing a vacuum between the first prism 211 and the second prism 212 is not performed, a very thin air layer may be formed therebetween.

In the exemplary embodiments to be described below, an air layer is described as being formed between the first prism 211 and the second prism 212, but the exemplary embodiment is not limited thereto. That is, in various exemplary embodiments of the invention, a low-refractive-index layer made of any material having a refractive index that is less than the refractive index of the first prism 211 and the second prism 212 may be formed between the first prism 211 and the second prism 212.

Under the second prism 212, the third prism 213 may be disposed. The third prism 213 is configured to filter light rays incident at an angle less than the detection target incident angle. For example, the third prism 213 may be configured to block light rays incident at an angle less than about 43 degrees, among light rays passing through the first prism 211 and the second prism 212.

The upper surface of the third prism 213 may be flat so as to be bonded to the lower surface of the second prism 212. The lower surface of the third prism 213 may include at least one 3-1-th inclined surface 213_1 and at least one 3-2-th inclined surface 213_2, which have different inclination angles. The at least one 3-1-th inclined surface 213_1 and the at least one 3-2-th inclined surface 213_2 are alternately disposed. The at least one 3-1-th inclined surface 213_1 and the at least one 3-2-th inclined surface 213_2, which are alternately disposed, form prism mountains and prism valleys in parts at which they meet. Here, the 3-1-th inclined surface 213_1 may be an absorbing surface for absorbing light rays incident thereon, and the 3-2-th inclined surface 213_2 may be a transmitting surface for blocking light rays incident at an angle less than the detection target incident angle.

A light-absorbing layer P2 including a light-absorbing material may be formed on the 3-1-th inclined surface 213_1. In various exemplary embodiments of the invention, the angle (a 3-1-th inclination angle, θ3) between the 3-1-th inclined surface 213_1 and a straight line perpendicular to the upper surface of the third prism 213 may be about 45 degrees.

The 3-2-th inclined surface 213_2 may be configured to filter incident light rays. The 3-2-th inclined surface 213_2 is configured to reflect light rays incident at an angle less than the detection target incident angle and to refract the remaining light rays downwards. In various exemplary embodiments of the invention, the angle (a 3-2-th inclination angle, θ4) between the 3-2-th inclined surface 213_2 and a straight line perpendicular to the upper surface of the third prism 213 may fall within a range from about 2 to about 10 degrees. Meanwhile, as illustrated in FIG. 4, a light ray incident at an angle less than the detection target incident angle is reflected from the 3-2-th inclined surface 213_2 and is then absorbed by the 3-1-th inclined surface 213_1 by reaching the 3-1-th inclined surface 213_1. Accordingly, light rays incident at an angle less than the detection target incident angle are effectively blocked by the third prism 213.

As illustrated in FIG. 4, light rays incident at an angle less than the detection target incident angle (for example, about 43 to about 47 degrees) are blocked by the third prism 213. Therefore, only light rays incident at an angle that falls within the detection target incident angle range pass through the optical unit 21 by being transmitted by the first to third prisms 211, 212 and 213.

In an exemplary embodiment of the invention, a support substrate 215 may be further provided between the second prism 212 and the third prism 213. The support substrate 215 may be made of a glass material, but is not limited thereto. The support substrate 215 may be made of any material having the same refractive index as the second prism 212 and the third prism 213.

As illustrated in FIG. 4, when the detection target incident angle falls within a range from about 43 to about 47 degrees, a light ray incident at the minimum detection target incident angle exits the 3-2-th inclined surfaces 213_2 of the third prism 213 at an angle of about 4.23 degrees. Also, a light ray incident at the maximum detection target incident angle exits the 3-2-th inclined surfaces 213_2 of the third prism 213 at an angle of about 19.48 degrees. The exiting light rays may be collected by the light-receiving unit 50.

In various exemplary embodiments, the light-receiving unit 50 is configured with light-receiving elements, which are spaced at preset intervals on the substrate. Referring to FIG. 5, light rays exiting the 3-2-th inclined surfaces 213_2 are separated by the 3-1-th inclined surfaces 213_1 when the distance from the third prism 213 is short, but may overlap each other as the distance from the third prism 213 is longer. That is, in the first area that is close to the third prism 213, there is a non-exit area in which light does not exit in the vicinity of the 3-1-th inclined surface 213_1. In the second area, there are few non-exit areas, and the light rays exiting the 3-2-th inclined surfaces 213_2 are appropriately separated. In the third area, which is far from the third prism 213, the light rays exiting the 3-2-th inclined surfaces 213_2 overlap each other, and may thus interfere with each other.

When the light-receiving unit 50 is disposed in the first area, a special process for disposing the light-receiving elements so as to match the 3-2-th inclined surfaces 213_2 is required. When the light-receiving unit 50 is disposed in the third area, because light rays changed due to mutual interference are received, the fingerprint of a user is not correctly recognized. Therefore, the distance between the optical unit 20 and the light-receiving unit 50 may be appropriately set such that the light rays exiting the optical unit 20 are properly received by the light-receiving unit 50 (that is, the light-receiving unit 50 is disposed in the second area in FIG. 5).

In various exemplary embodiments, the distance from the optical unit 20 to the second area may be set depending on the longitudinal lengths of the 3-1-th inclined surface 213_1 and the 3-2-th inclined surface 213_2 that constitute the third prism 213. Accordingly, when the distance between the optical unit 20 and the light-receiving unit 50 is preset based on the manufacturing protocol, the standards of the 3-1-th inclined surface 213_1 and the 3-2-th inclined surface 213_2 of the third prism 213 may be selected such that the light-receiving unit 50 is disposed in the second area in FIG. 5.

Figure 6:
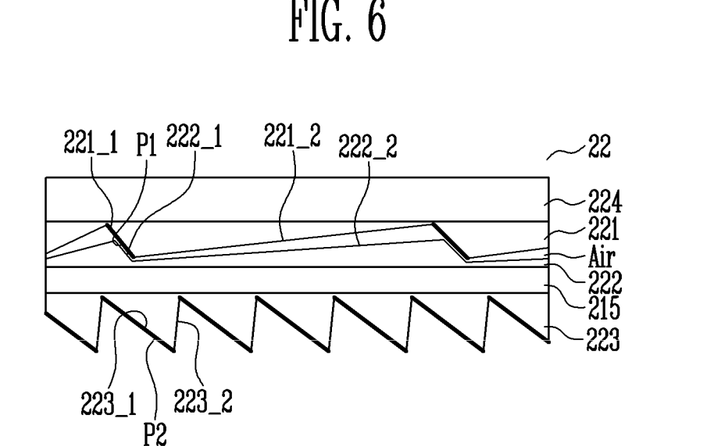
FIG. 6 is a cross-sectional view of an optical unit constructed according to a second exemplary embodiment of the invention.
Figure 7:
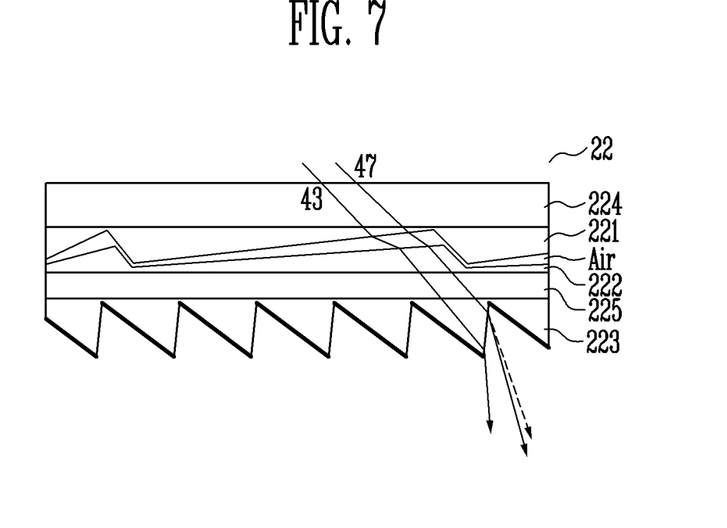
FIG. 7 is a cross-sectional view schematically illustrating the operating principle of the optical unit constructed according to the second exemplary embodiment of the invention.

FIG. 6 is a cross-sectional view of an optical unit according to a second exemplary embodiment of the invention, and FIG. 7 is a cross-sectional view schematically illustrating the operation principle of the optical unit according to the second exemplary embodiment of the invention.

Referring to FIG. 6, the optical unit 22 according to the second exemplary embodiment of the invention is configured such that the shape of the upper surface of a second prism 222 does not match the shape of the lower surface of a first prism 221, as opposed to the first exemplary embodiment.

In the first exemplary embodiment, the 2-1-th inclined surface 222_1 of the second prism 222 may face the 1-1-th inclined surface 221_1 of the first prism 221, and the 2-2-th inclined surface 222_2 may be parallel to the 1-2-th inclined surface 221_2. In the second exemplary embodiment of the invention, the 2-1-th inclined surface 222_1 is parallel to the 1-1-th inclined surface 221_1, but the 2-2-th inclined surface 222_2 is not parallel to the 1-2-th inclined surface 221_2.

In such an exemplary embodiment, the 2-2-th inclined surface 222_2 may be formed so as to be closer to the horizontal direction than the 1-2-th inclined surface 221_2 in order to enable light rays passing through the second prism 222 to reach the 3-2-th inclined surface 223_2 of the third prism 223. Here, the angle of a light ray passing through the third prism 223 may be changed depending on the angle between the surface extended from the 1-2-th inclined surface 221_2 and the surface extended from the 2-2-th inclined surface 222_2.

Figure 8A:
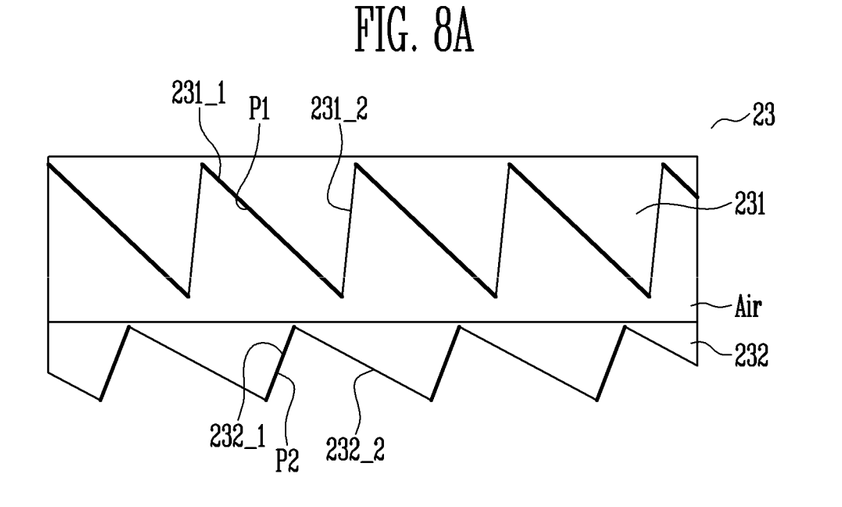
FIGS. 8A and 8B are cross-sectional views of an optical unit constructed according to a third exemplary embodiment of the invention.
Figure 8B:
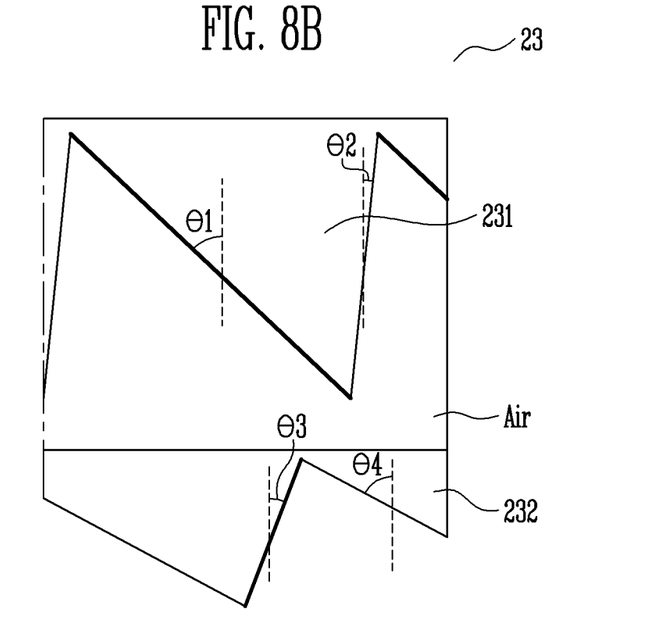
Figure 9:
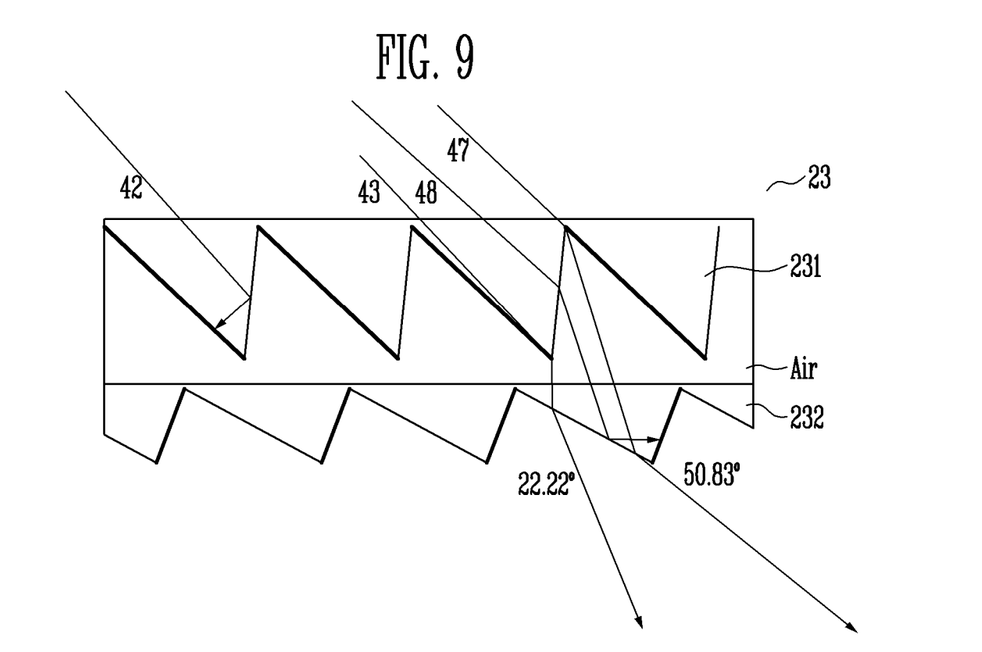
FIG. 9 is a cross-sectional view schematically illustrating the operational principle of the optical unit constructed according to the third exemplary embodiment of the invention.

FIG. 8A and FIG. 8B are cross-sectional views of an optical unit according to a third exemplary embodiment of the invention, and FIG. 9 is a cross-sectional view schematically illustrating the operation principle of the optical unit constructed according to the third exemplary embodiment of the invention.

Referring to FIG. 8A, FIG. 8B and FIG. 9, the optical unit 23 according to the third exemplary embodiment of the invention may include at least one prism in order to transmit only light rays incident at an angle that falls within a detection target incident angle range and to deliver the transmitted light rays to the light-receiving unit 50. Specifically, the optical unit 23 may be configured to transmit light rays incident from the ridges of the fingerprint of a user, from which light rays incident from the valleys thereof are removed, for example, only light rays incident at an angle that falls within the range of about 45±2 degrees.

The optical unit 23 according to the third exemplary embodiment of the invention may include a first prism 231 and a second prism 232. Each of the prisms 231 and 232 may be made of a material with a reflectance in the range of about 1.4 to about 1.6. In an exemplary embodiment, each of the prisms 231 and 232 may be made of a glass material, the reflectance of which is 1.5. Each of the prisms 231 and 232 may include first inclined surfaces and second inclined surfaces, the inclination angle of which differs from that of the first inclined surfaces.

The first prism 231 is configured to filter light rays incident at an angle less than the detection target incident angle. For example, the first prism 231 may be configured to block light rays incident at an angle less than about 43 degrees.

The upper surface of the first prism 231 may be flat. In an exemplary embodiment of the invention, an upper substrate may be disposed on the upper surface of the first prism 231.

The lower surface of the first prism 231 may include at least one 1-1-th inclined surface 231_1 and at least one 1-2-th inclined surface 231_2, which have different inclination angles. Here, the 1-1-th inclined surface 231_1 may be an absorbing surface for absorbing light rays incident thereon, and the 1-2-th inclined surface 231_2 may be a transmitting surface for blocking light rays incident at an angle less than the detection target incident angle.

The 1-1-th inclined surface 231_1 may be configured to absorb light rays coming from the right side of a straight line perpendicular to the upper surface of the first prism 231 to the left side thereof. For example, a light-absorbing layer P1 including a light-absorbing material may be formed on the 1-1-th inclined surface 231_1. In various exemplary embodiments of the invention, the angle (a 1-1-th inclination angle, $\theta 1$) between the 1-1-th inclined surface 231_1 and a straight line perpendicular to the upper surface of the first prism 231 may be about 45 degrees.

The 1-2-th inclined surface 231_2 may be configured to filter light rays coming from the left side of a straight line perpendicular to the upper surface of the first prism 231 to the right side thereof. The 1-2-th inclined surface 231_2 is configured to reflect light rays incident at an angle less than the detection target incident angle and to refract the remaining light rays downwards. In various exemplary embodiments of the invention, the angle (a 1-2-th inclination angle, $\theta 2$) between the 1-2-th inclined surface 231_2 and a straight line perpendicular to the upper surface of the first prism 231 may be about 6 degrees. As illustrated in FIG. 9, a light ray incident at an angle that is less than the detection target incident angle is reflected from the 1-2-th inclined surface 231_2 and is then absorbed by the 1-1-th inclined surface 231_1 by reaching the 1-1-th inclined surface 231_1. Accordingly, light rays incident at an angle less than the detection target incident angle are effectively blocked by the first prism 231.

As illustrated in FIG. 9, light rays incident at an angle less than the detection target incident angle (for example, about 43 to about 47 degrees) are blocked by the first prism 231, and only light rays incident at an angle that is equal to or greater than the detection target incident angle pass through the first prism 231.

Under the first prism 231, the second prism 232 is disposed. The second prism 232 is configured to filter light rays incident at an angle greater than the detection target incident angle. For example, the second prism 232 may be configured to block light rays incident at an angle greater than about 47 degrees, among light rays incident after passing through the first prism 231.

The upper surface of the second prism 232 may be flat. In the space between the first prism 231 and the second prism 232, an air layer may be formed. However, the inventive concepts are not limited thereto, and a low-refractive-index layer consisting of any material having a refractive index that is less than the refractive index of the first prism 231 and the second prism 232 may be formed between the first prism 231 and the second prism 232.

The lower surface of the second prism 232 may include at least one 2-1-th inclined surface 232_1 and at least one 2-2-th inclined surface 232_2, which have different inclination angles. Here, the 2-1-th inclined surface 232_1 may be an absorbing surface for absorbing light rays incident thereon, and the 2-2-th inclined surface 232_2 may be a transmitting surface for blocking light rays incident at an angle greater than the detection target incident angle.

A light-absorbing layer P2 including a light-absorbing material may be formed on the 2-1-th inclined surface 232_1. In various exemplary embodiments of the invention, the angle (a 2-1-th inclination angle, $\theta 3$) between the 2-1-th inclined surface 232_1 and a straight line perpendicular to the upper surface of the second prism 232 may be about 45 degrees.

The 2-2-th inclined surface 232_2 may be provided in order to filter incident light rays. The 2-2-th inclined surface 232_2 is configured to reflect light rays incident at an angle greater than the detection target incident angle and to refract the remaining light rays downwards. In various exemplary embodiments of the invention, the angle (a 2-2-th inclination angle, $\theta 4$) between the 2-2-th inclined surface 232_2 and a straight line perpendicular to the upper surface of the second prism 232 may be about 62 degrees.

As illustrated in FIG. 9, light rays incident at an angle greater than the detection target incident angle (for example, about 43 to about 47 degrees) are blocked by the second prism 232. Therefore, only light rays incident at an angle that falls within the detection target incident angle range pass through the optical unit 23 by being transmitted by the first and second prisms 231 and 232.

Figure 10:
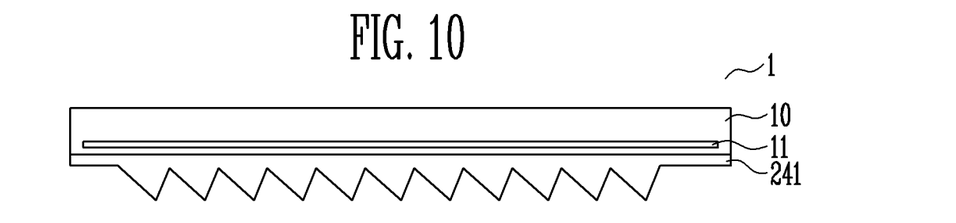
FIG. 10 is a cross-sectional view of a display device including an optical unit constructed according to a fourth exemplary embodiment of the invention.
Figure 11:
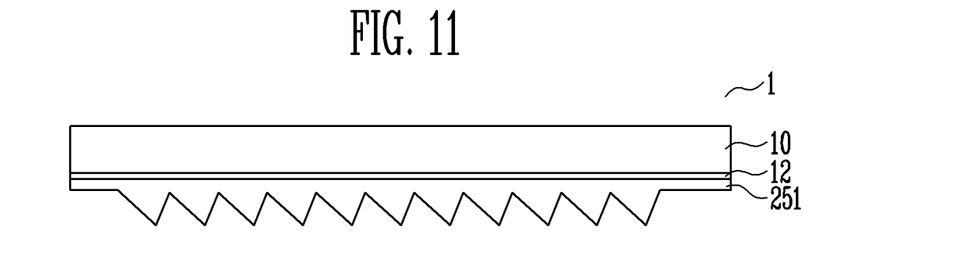
FIG. 11 is a cross-sectional view of a display device including an optical unit constructed according to a fifth exemplary embodiment of the invention.

FIG. 10 is a cross-sectional view of a display device including an optical unit constructed according to a fourth exemplary embodiment of the invention, and FIG. 11 is a cross-sectional view of a display device including an optical unit constructed according to a fifth exemplary embodiment of the invention.

The optical unit of the display device 1 according to the fourth and fifth exemplary embodiments of the invention may include a first prism 241 or 251. In such exemplary embodiments, a display panel 10 may include a multilayer film 11 or 12 consisting of multiple insulating films having different refractive indices. The multilayer film 11 or 12 may be placed inside the display panel 10, as illustrated in FIG. 10, or may be bonded to the lower surface of the display panel 10, as illustrated in FIG. 11.

In an exemplary embodiment in which the multilayer film 11 is placed inside the display panel 10, as illustrated in FIG. 10, the multilayer film 11 may be multiple insulating layers that constitute the driving module of the display panel 10 and/or a set of protective layers. At least some of the multiple insulating layers and/or the protective layers that constitute the multilayer film 11 may consist of materials having different refractive indices.

In an exemplary embodiment in which the multilayer film 12 is a separate film bonded to the lower surface of the display panel 10, as illustrated in FIG. 11, the multilayer film 12 may be an optical film configured to control a transmission angle, or the like.

The multilayer film 11 or 12 is configured to filter light rays incident at an angle that is greater than the detection target incident angle or at an angle that is less than the detection target incident angle. For example, the multilayer film 11 or 12 may be configured to block light rays incident at an angle greater than about 47 degrees or to block light rays incident at an angle less than about 43 degrees.

The first prism 241 or 251 may be configured to transmit only light rays incident at an angle that falls within a detection target incident angle range, among light rays transmitted by the multilayer film 11 or 12. In an exemplary embodiment, when the multilayer film 11 or 12 is configured to block light rays incident at an angle greater than the detection target incident angle, the first prism 241 or 251 may be configured to block light rays incident at an angle less than the detection target incident angle. In another exemplary embodiment, when the multilayer film 11 or 12 is configured to block light rays incident at an angle less than the detection target incident angle, the first prism 241 or 251 may be configured to block light rays incident at an angle greater than the detection target incident angle.

The upper surface of the first prism 241 or 251 may be flat, and may be bonded to the lower surface of the display panel 10. The lower surface of the first prism 241 or 251 may include at least one 1-1-th inclined surface and at least one 1-2-th inclined surface, which have different inclination angles. Here, the 1-1-th inclined surface is an absorbing surface for absorbing light rays incident thereon, and the 1-2-th inclined surface may be a transmitting surface for filtering light rays. Depending on the incident angle of light rays to be blocked, the 1-1-th inclined surface and the 1-2-th inclined surface are configured as described above with reference to FIGS. 2 to 9, and thus a detailed description thereof will be omitted.

Some of the advantages that may be achieved by exemplary embodiments of the invention include enabling an optical unit for a fingerprint sensor to be integrated into a display panel, whereby an integrated display unit with an optical unit for a fingerprint sensor may be readily produced and sold.

Also, the optical unit and the display device including same unit according to the principles and exemplary embodiments of the invention variably apply the size of a prism depending on the distance between the light-receiving unit of an electronic device and the optical unit of the display device, thereby increasing the flexibility of a manufacturing process.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An optical unit for a fingerprint sensor of a display device, the optical unit comprising:
 a first prism to block light rays incident at an angle greater than a detection target incident angle;
 a second prism disposed under the first prism to block light rays incident at an angle less than the detection target incident angle; and
 a third prism supporting the first prism, and being disposed between the first prism and the second prism.

2. The optical unit according to claim 1, wherein the detection target incident angle falls within a range from about 43 degrees to about 47 degrees.

3. The optical unit according to claim 1, wherein the first prism comprises:
 an upper surface; and
 a lower surface including at least one first inclined surface and at least one second inclined surface, the at least one first inclined surface and the at least one second inclined surface are alternately disposed and have different inclination angles.

4. The optical unit according to claim 3, wherein:
 an angle between the at least one first inclined surface and a straight line perpendicular to the upper surface of the first prism is about 45 degrees; and
 an angle between the at least one second inclined surface and the straight line perpendicular to the upper surface of the first prism falls within a range from about 80 degrees to about 88 degrees.

5. The optical unit according to claim 3, further comprising:
 a light-absorbing layer provided on the at least one first inclined surface to absorb light rays incident thereon.

6. The optical unit according to claim 3, wherein the second prism comprises:
 an upper surface; and
 a lower surface including at least one first inclined surface and at least one second inclined surface, the at least one first inclined surface and the at least one second inclined surface are alternately disposed and have different inclination angles.

7. The optical unit according to claim 6, wherein:
 an angle between the at least one first inclined surface of the second prism and a straight line perpendicular to the upper surface of the second prism is about 45 degrees; and
 an angle between the at least one second inclined surface of the second prism and a straight line perpendicular to the upper surface of the second prism falls within a range from about 2 degrees to about 10 degrees.

8. The optical unit according to claim 6, further comprising:
 a light-absorbing layer provided on the at least one first inclined surface of the second prism to absorb light rays incident thereon.

9. The optical unit according to claim 6, wherein the third prism comprises:
 an upper surface that faces the lower surface of the first prism and has a shape conforming to a shape of the lower surface of the first prism; and
 a lower surface in contact with the upper surface of the second prism.

10. The optical unit according to claim 9, wherein the upper surface of the third prism comprises:
 at least one first inclined surface that faces the at least one first inclined surface of the first prism and is substantially parallel to the at least one first inclined surface of the first prism; and
 at least one second inclined surface that faces the at least one second inclined surface of the first prism and is substantially parallel to the at least one second inclined surface of the first prism.

11. The optical unit according to claim 9, wherein the upper surface of the third prism comprises:
 at least one first inclined surface that faces the at least one first inclined surface of the first prism and is substantially parallel to the at least one first inclined surface of the first prism; and
 at least one second inclined surface that faces the at least one second inclined surface of the first prism and is angled relative to the at least one second inclined surface of the first prism.

12. The optical unit according to claim 9, further comprising:
an air layer or a low-refractive-index layer disposed between the first prism and the third prism.

13. A display device, comprising:
a display panel to display an image; and
an optical unit for a finger print sensor disposed under the display panel to transmit only light rays incident at a detection target incident angle, wherein the optical unit comprises at least one prism having multiple inclined surfaces alternately disposed and having different inclination angles,
wherein the optical unit comprises:
a first prism to block light rays incident at an angle greater than the detection target incident angle;
a second prism disposed under the first prism to block light rays incident at an angle less than the detection target incident angle; and
a third prism configured to support the first prism and being disposed between the first prism and the second prism.

14. The display device according to claim 13, wherein:
the first prism comprises an upper surface; and a lower surface including at least one first inclined surface and at least one second inclined surface, which are alternately disposed and have different inclination angles,
the second prism comprises an upper surface; and a lower surface including at least one first inclined surface and at least one second inclined surface, which are alternately disposed and have different inclination angles, and
the third prism comprises an upper surface that faces the lower surface of the first prism and has a shape conforming with a shape of the lower surface of the first prism; and a lower surface in contact with the upper surface of the second prism.

15. The display device according to claim 14, further comprising:
a first light-absorbing layer and a second light-absorbing layer provided on the first inclined surface of the first prism and the first inclined surface of the second prism, respectively.

16. The display device according to claim 13, wherein:
the display panel comprises a multilayer film including multiple insulating layers having different refractive indices, and
the optical unit comprises a first prism including an upper surface and a lower surface, which includes at least one first inclined surface and at least one second inclined surface, which are alternately disposed and have different inclination angles.

17. An electronic device, comprising:
a display panel to display an image;
an optical unit for a fingerprint sensor disposed under the display panel to transmit only light rays incident at a detection target incident angle; and
a light-receiving unit to collect the light rays passing through the optical unit and to convert the light rays into electrical signals,
wherein the optical unit comprises:
a first prism to block light rays incident at an angle greater than the detection target incident angle;
a second prism disposed under the first prism to block light rays incident at an angle less than the detection target incident angle; and
a third prism configured to support the first prism and being disposed between the first prism and the second prism, and
wherein at least one of the first, second, or third prism has multiple inclined surfaces, which are alternately disposed and have different inclination angles.

* * * * *